US012663095B2

(12) United States Patent
Raff et al.

(10) Patent No.: US 12,663,095 B2
(45) Date of Patent: Jun. 23, 2026

(54) PIVOTED ARMATURE FOR AN ELECTROMAGNETIC PIVOTED ARMATURE VALVE, AND METHOD FOR PROVIDING SUCH A PIVOTED ARMATURE

(71) Applicant: ETO MAGNETIC GmbH, Stockach (DE)

(72) Inventors: Viktor Raff, Constance (DE); Jörg Bürssner, Engen (DE)

(73) Assignee: ETO MAGNETIC GmbH, Stockach (DE)

( * ) Notice: Subject to any disclaimer, the term of this patent is extended or adjusted under 35 U.S.C. 154(b) by 162 days.

(21) Appl. No.: 18/684,431

(22) PCT Filed: Aug. 17, 2022

(86) PCT No.: PCT/EP2022/072952
§ 371 (c)(1),
(2) Date: Jul. 24, 2024

(87) PCT Pub. No.: WO2023/021085
PCT Pub. Date: Feb. 23, 2023

(65) Prior Publication Data
US 2025/0271075 A1 Aug. 28, 2025

(30) Foreign Application Priority Data
Aug. 18, 2021 (DE) ..................... 10 2021 121 425.4

(51) Int. Cl.
*F16K 31/06* (2006.01)
(52) U.S. Cl.
CPC ............................... *F16K 31/0682* (2013.01)

(58) Field of Classification Search
CPC .................................................. F16K 31/0682
See application file for complete search history.

(56) References Cited

U.S. PATENT DOCUMENTS

| | | | |
|---|---|---|---|
| 2,587,356 A | 2/1952 | Mcpherson | |
| 3,982,562 A * | 9/1976 | Pickett | F16K 31/105 137/870 |
| 4,250,924 A * | 2/1981 | Sakakibara | F16K 31/0682 137/868 |
| 4,446,889 A * | 5/1984 | Sakakibara | F16K 31/0682 335/270 |

(Continued)

FOREIGN PATENT DOCUMENTS

| | | |
|---|---|---|
| DE | 7116788 U | 8/1971 |
| DE | 102016125950 A1 | 7/2018 |

OTHER PUBLICATIONS

Office Action received in related European Application No. 22765831.7, mailed Nov. 21, 2024, 10 pages.

(Continued)

*Primary Examiner* — Umashankar Venkatesan
(74) *Attorney, Agent, or Firm* — Womble Bond Dickinson (US) LLP

(57) ABSTRACT

A pivoted armature for an electromagnetic pivoted armature solenoid valve, comprises a bearing and a seal, wherein the pivoted armature comprises a first sub-body and a second sub-body, the seal and the bearing being arranged between the first sub-body and the second sub-body and the first sub-body being connected to the second sub-body in a loss-proof manner.

16 Claims, 3 Drawing Sheets

(56) References Cited

U.S. PATENT DOCUMENTS

Figure 1:
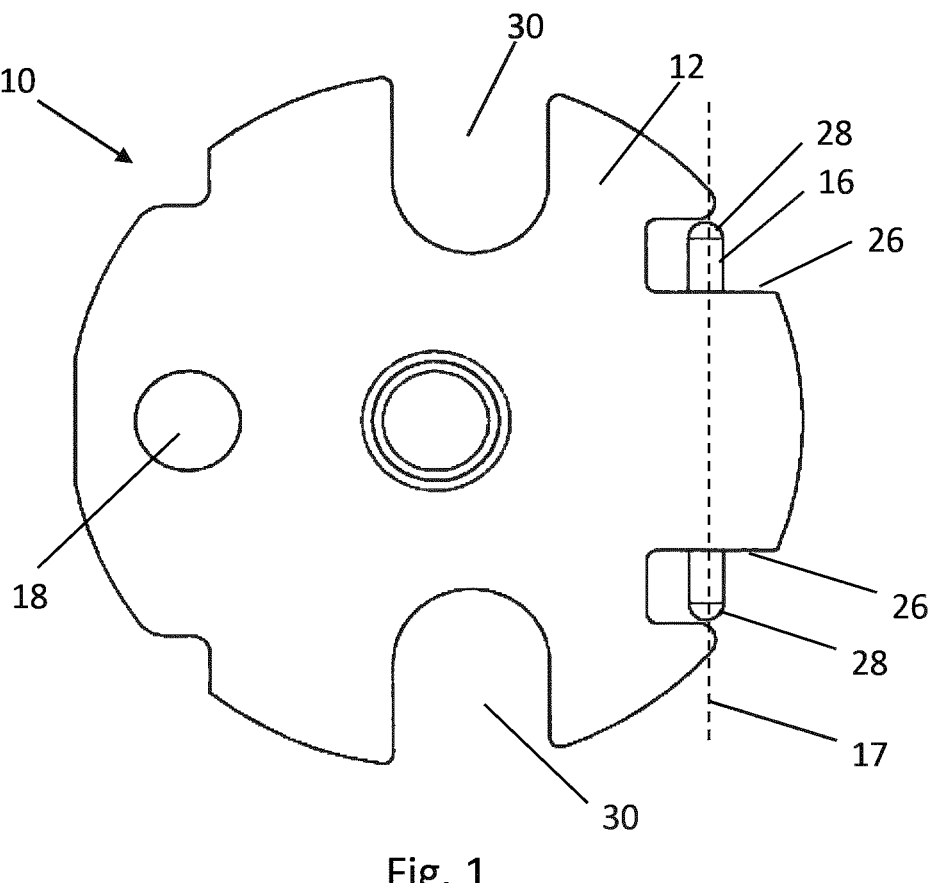

| | | | | |
|---|---|---|---|---|
| 4,610,425 | A * | 9/1986 | Kelly | F23N 1/00 |
| | | | | 251/303 |
| 5,139,226 | A * | 8/1992 | Baldwin | H01F 7/14 |
| | | | | 137/625.65 |
| 5,653,422 | A * | 8/1997 | Pieloth | F16K 31/0682 |
| | | | | 137/596.17 |
| 5,681,508 | A * | 10/1997 | Gerhardy | F02M 17/04 |
| | | | | 251/86 |
| 9,404,602 | B2 * | 8/2016 | Cebon | F16K 31/0682 |
| 10,288,187 | B2 * | 5/2019 | Vogt | F16K 31/0679 |
| 10,913,088 | B2 * | 2/2021 | Fukada | B05C 5/0291 |
| 11,047,501 | B2 * | 6/2021 | Leeseberg | F16K 31/0682 |
| 11,067,189 | B2 * | 7/2021 | Thode | F16K 31/0682 |
| 2002/0067100 | A1 * | 6/2002 | Rieck | F16K 31/0682 |
| | | | | 310/254.1 |
| 2011/0155931 | A1 * | 6/2011 | Weiss | F16K 31/06 |
| | | | | 251/65 |

OTHER PUBLICATIONS

Search Report received in related German Application No. 10 2021 121 425.4, mailed May 25, 2022, 11 pages.
International Search Report received in related International Application No. PCT/EP2022/072952, mailed Nov. 29, 2022, 2 pages.
International Preliminary Report on Patentability received in related International Application No. PCT/EP2022/072952, mailed Feb. 13, 2024, 5 pages.

* cited by examiner

PIVOTED ARMATURE FOR AN ELECTROMAGNETIC PIVOTED ARMATURE VALVE, AND METHOD FOR PROVIDING SUCH A PIVOTED ARMATURE

CROSS-REFERENCE TO RELATED APPLICATIONS

This patent application is based on and incorporates herein by reference the German patent Application DE 10 2021 121 425.4, filed on Aug. 18, 2021, and the international patent application PCT/EP2022/072952, filed on Aug. 17, 2022.

The present invention relates to a pivoted armature for an electromagnetic pivoted armature solenoid valve. The present invention further relates to a method for producing such a pivoted armature. The present invention further relates to an electromagnetic pivoted armature solenoid valve having such a pivoted armature.

Such pivoted armatures are known in principle from their use in pivoted armature solenoid valves which are also known as flat armature solenoid valves. In the known pivoted armature solenoid valves, the pivoted armatures are electromagnetically movable or pivotable between an open position and a closed position via a coil which surrounds a coil core. As a result of the electromagnetically inducible pivoting movement of the pivoted armature, a valve seat is exposed or closed so that the valve functionality is brought about in this manner. The known pivoted armatures generally have a flat, disk-like shape and are in the form of integral members. The movability of the pivoted armature relative to the valve seat of the pivoted armature solenoid valve is enabled by a one-sided securing or articulated connection of the pivoted armature, for example, to a valve housing, so that the pivoted armature can rotate about a rotation axis around the articulated connection. The sealing between the pivoted armature and the valve seat is brought about in the closed position of the valve in that a seal which is provided in the pivoted armature abuts against the valve seat in such a manner that it can be closed in a fluid-tight manner.

DE 10 2016 125 950 A1 discloses, for example, a pivoted armature solenoid valve which comprises a valve housing, a coil having a coil core and an integral pivoted armature. The pivoted armature is integrally configured and movably connected to the valve housing via a pivoting articulation, wherein the pivoting articulation is rotatably secured in articulation sockets, for example, by means of second bearing journals which project from the pivoted armature. Generally, these bearing journals or bearing axles are individually fixed by means of a welding process or an adhesive process to two mutually opposite side faces (when viewed in a vertical direction of the pivoted armature). Consequently, two bearing journals which each have to be fixed are required for this structure. Consequently, there is an additional requirement for individual parts. Furthermore, the production of the pivoted armature is more complex since a plurality of production steps are necessary for providing the bearing. Furthermore, the known securing is also disadvantageous in that, during opening and closing of the pivoted armature, a high force transmission has to be ensured and consequently the connection between the bearing axle and the pivoted armature has to be configured in a particularly stable manner, which also means an additional constructive complexity. Furthermore, it is not possible as a result of the configuration to configure the bearing axles with respect to the respective rotation axis thereof in a congruent manner with a middle plane of the pivoted armature when viewed in a vertical direction so that an internal torsional moment can be produced inside a pivoted armature as a result.

Introducing the seal is also found to be disadvantageous in the known pivoted armatures because it often has to be secured to the armature by means of a complex vulcanization process. Alternatively, the seal may also be in the form of an insertion seal or a pull-in seal. The last types mentioned of the seal attachment have the disadvantage that the sealing element has to be very soft and, in a mounted position of the seal, undesirable deformation, increased wear, sliding out and/or tearing of the seal may occur. All this again acts in a disadvantageous manner on the durability and functional reliability of the pivoted armature solenoid valve.

DE 71 16 788 U already discloses a valve having a tilting armature, which can be actuated by an electromagnet and which is under the pretensioning of a spring and which is supported in a fixed manner on a portion of the magnet core, and having a valve seat which is directed toward the armature and which can be closed thereby. A plate is secured to the surface of the armature by means of a retention plate, the downwardly directed tongues of which are clamped to the armature. The retention plate is provided with a recess and the rubber plate is provided with a recess, through which the angled end of a leaf spring extends. The lower, angled end of the leaf spring projects into a rectangular or at least non-round surface of the armature, wherein this groove is only slightly longer than the width of the leaf spring so that the armature can neither move linearly nor rotate in its plane but can be tilted about the edge of the leg of the magnet core.

U.S. Pat. No. 2,587,356 A also already discloses a valve. A flexible membrane is clamped at the circumference between cast members by means of sealing means, wherein the membrane extends transversely relative to a chamber over the seats. At one side, the membrane carries a rigid support disk with resilient circular valve elements secured thereon for closing the connection with respect to the seats. At the other side, the membrane carries an electromagnetic armature, wherein the armature has a smaller width than the external delimitation.

The above-mentioned disadvantages lead to the consequence of a cost-effective mass-production or batch production of pivoted armature solenoid valves being possible only in a very limited manner and accordingly this valve technology could not until now achieve its full potential as a result of costs. Therefore, there is an inherent need to overcome the above-mentioned disadvantages of the prior art.

On the basis of the prior art mentioned above, therefore, an object of the present invention is to further develop a pivoted armature for an electromagnetic pivoted armature solenoid valve so that the above-mentioned disadvantages can be overcome in a constructive manner.

In order to achieve this object, a pivoted armature according to the invention is proposed, with a bearing and a seal. The pivoted armature according to the invention is characterized in that it comprises a first sub-body and a second sub-body, the seal and the bearing are arranged between the first sub-body and the second sub-body and the first sub-body is connected to the second sub-body in a loss-proof manner.

A main advantage of the pivoted armature according to the invention is evident in the constructive structure because, by providing the two sub-bodies in the non-assembled state of the pivoted armature, it becomes possible to insert the seal and the bearing between the two sub-bodies. The pivoted armature is then provided by joining the first sub-body and the second sub-body, between which the seal and the bearing are introduced. Unlike the prior art, therefore, the pivoted armature is no longer integrally in the form of a single, disk-like component but is instead composed of two sub-bodies. Consequently, the production is substantially facilitated. For example, the attachment of the bearing in comparison with the prior art is also substantially simplified because, for example, the bearing can be clamped between the two sub-bodies in the form of a bearing rod or bearing axle. It is thereby possible to dispense with an otherwise complex welding or adhesive process. As a result of the configuration according to the invention of the pivoted armature, the seal can also have a greater rigidity and consequently useful lifespan since it is not necessary to pull in or vulcanize the seal in order to fit it. Instead, the seal can preferably be simply inserted between the first sub-body and the second sub-body. Overall, therefore, the production of the pivoted armature can be simplified in a surprisingly simple manner so that mass-production and automation are enabled in a cost-effective manner.

In this instance, the term "pivoted armature" is intended to be understood to be a flat armature or an armature in a synonymous manner. In the assembled state, the pivoted armature is preferably substantially disk-like. The term "substantially disk-like" is intended to be understood here to be the outermost, circumferential basic shape without in this instance recesses or material cut-outs being taken into consideration. For example, the pivoted armature may, when viewed in cross section, have a round or oval basic shape. Depending on the valve construction type, an angular shape may also be possible in principle. The pivoted armature is preferably characterized in that it has at least one flat side which is directed in the direction of the valve seat when the pivoted armature is in the assembled state. It may also be advantageous for the pivoted armature to have two opposite flat sides.

The respective sub-body is characterized in that it has a substantially disk-like, in particular cylindrical, basic shape with a specific thickness. The term "substantially disk-like" is intended to be understood here to be the outermost, circumferential basic shape without in this instance recesses or material cut-outs being taken into consideration. For example, the basic member may, when viewed in cross section, have a round or oval shape. Depending on the valve construction type, an angular shape may also be possible in principle. At least one of the sub-bodies is characterized in that it has at least one flat side which, in the connected state, corresponds to the preferred, at least one flat side of the pivoted armature. Preferably, an outer contour of the first sub-body corresponds to an outer contour of the second sub-body. The first sub-body and the second sub-body are consequently preferably identically shaped or congruent (when viewed for a respective substantially disk-like cross section). The first sub-body may differ from the second sub-body with regard to its thickness.

The term "seal" is intended to be understood here to be any type of sealing means which is suitable for insertion between the two sub-bodies and which has a rigidity necessary for the valve function. For example, it may be a sealing member with a predetermined rigidity which can be produced from rubber, a (synthetic) rubber or the like.

Furthermore, in order to achieve the above-mentioned object, a method for producing a pivoted armature for an electromagnetic pivoted armature solenoid valve which is characterized at least by the following steps is proposed. Providing a first sub-body of the pivoted armature, a second sub-body of the pivoted armature, a seal and a bearing. Inserting the seal in the first sub-body or in the second sub-body. Inserting the bearing in the first sub-body or in the second sub-body. Positioning the second sub-body relative to the first sub-body and joining the first sub-body with the second sub-body to form the pivoted armature.

It will be understood that the steps of the method according to the invention do not necessarily have to be carried out in the sequence mentioned. Furthermore, one or more intermediate steps can also be carried out between the steps mentioned without the protective scope of the method according to the invention being exceeded thereby. For example, it is unimportant whether the sub-body is inserted in the seal and/or the bearing. The steps can be carried out either manually, part-automatically or fully automatically. For example, it would be possible to carry out the steps by means of an industrial robot so that automated production of the pivoted armature is enabled. In particular, the production costs and the production time can thereby be reduced and consequently the resultant production product (that is to say, the pivoted armature) can be produced more cheaply.

Similarly, the object is achieved by an electromagnetic pivoted armature solenoid valve which has a valve housing, a coil core which is arranged in the valve housing and which is at least partially surrounded by an electromagnetically activatable coil and an embodiment of the pivoted armature according to the invention. In this case, the pivoted armature is particularly preferably connected to the valve housing so as to be pivotable and/or foldable about at least one bearing axle and is configured to cooperate with a fixed valve seat so that, in response to the coil being supplied with electrical power, closing or releasing of the valve seat can be carried out.

The valve housing may, for example, be produced from an injection-molded component. In principle, it also appears possible to produce the valve housing by means of a 3D printing method in order thereby to be able to achieve complex forms. Preferably, the pivoted armature solenoid valve comprises at least one inlet and at least one outlet, wherein the valve seat is preferably arranged at an outlet or surrounds the outlet. It is particularly preferable for the pivoted armature to be pretensioned by means of a spring against the valve seat in the non-energized state of the coil so that the valve is closed in this state. This simple embodiment of a currentlessly closed valve (NC=Normally Closed) appears to be particularly advantageous in technical energy terms because electrical energy is required only for opening the valve. Alternative embodiments of the valve seat and/or a resilient means which can preferably be used, in particular providing a possible (axial) opening through the coil core, are possible in principle and in particular allow a variation of a valve topology. Thus, for example, unlike an NC 2/2-way valve topology, an NO 2/2-way valve topology (NO=Normally Open) is conceivable, that is to say, a currentlessly opened topology with two inlets and outlets and/or two switching positions. Alternatively, a 3/2-way valve topology is also achievable.

In a preferred embodiment, the seal is inserted between the first sub-body and the second sub-body. This embodiment is found to be structurally advantageous because a simple assembly of the pivoted armature is thereby enabled. In particular, it is also possible to dispense with drawing in or vulcanizing. The seal can instead be inserted in a simple manner between the first sub-body and the second sub-body and can consequently be moved into a predetermined position before the two sub-bodies are joined. In this instance, in principle, the location at which the seal is inserted between the sub-bodies can be freely selected. This is substantially dependent on the construction of the respective pivoted armature solenoid valve or a position and positioning of the valve seat within the pivoted armature solenoid valve.

In another preferred embodiment, the first sub-body and/ or the second sub-body comprise(s) at least one recess which is formed to at least partially receive the seal. It will be understood that in principle only one of the two sub-bodies can comprise the recess in order to receive the seal completely. Which of the two sub-bodies has the recess is freely selectable in principle in this case. It is also possible for both sub-bodies each to comprise a mutually corresponding recess so that the seal is, for example, partially received in the first sub-body and partially received in the second sub-body. Furthermore, it is particularly preferable for the recess to be provided, for example, in the form of a stepped hole in the first and/or second sub-body. Such a stepped hole has, for example, a step or a, for example, circular shoulder region against which the seal can bear during insertion so that the seal is prevented from falling out and a support region for the seal is provided. Furthermore, the recess preferably has a through-hole which preferably has such dimensions that the valve seat can be introduced into the through-hole in a closed position of the pivoted armature solenoid valve. In this manner, the relevant valve seat in the closed state of the valve is still in contact only with the seal and does not touch the sub-body which surrounds the seal. A complete seal can thereby be achieved because the seal barrier is formed directly between the seal and the valve seat.

In another preferred embodiment, the bearing comprises an, in particular, rod-like bearing axle. The bearing is therefore, for example, in the form of a rod and has such dimensions that, during insertion between the two sub-bodies, two mutually opposite end regions of the bearing, when viewed in the longitudinal direction thereof, project beyond a circumferential contour of the pivoted armature or the respective sub-body. Consequently, a securing of the pivoted armature, for example, to counter-bearings in the valve housing may be enabled. The bearing is preferably in the form of a round rod, the diameter of which is less than a disk thickness of the disk-like pivoted armature. The two sub-bodies of the pivoted armature preferably comprise an elongate recess, for example, in the form of a groove which has a (partially) round cross section and in which the bearing can be inserted. Such a groove in particular acts as an auxiliary centering means during the assembly of the pivoted armature or during the positioning of the bearing axle or the bearing rod relative to the respective sub-body. The bearing axle can preferably, when viewed along the longitudinal extent thereof, have an annular collar which is arranged in a centered manner and for which there is a corresponding recess in at least one of the sub-bodies so that a centering of the bearing axle relative to the respective sub-body can thereby be readily ensured. The recess or groove which receives the bearing axle preferably has such dimensions that clamping or fitting the bearing axle in the groove or recess is enabled. The bearing is thereby connected to the sub-body of the pivoted armature in a rotationally secure manner in a particularly simple manner with respect thereto.

In another preferred embodiment, the, in particular rod-like, bearing axle is clamped between the first sub-body and the second sub-body in the connected state of the first and second sub-bodies. In principle, it is also possible for the bearing axle to be adhesively bonded, soldered or welded between the first and second sub-bodies alternatively or additionally.

In another preferred embodiment, the first sub-body is connected to the second sub-body by clinching, welding, adhesive bonding or riveting. In principle, other joining techniques are also conceivable and are suitable for connecting the first sub-body to the second sub-body in a loss-proof manner, that is to say, securely and in particular non-movably with respect to each other.

In another preferred embodiment, the first sub-body and/ or the second sub-body have/has a substantially disk-like shape. It may be mentioned that when the first and second sub-bodies are in the connected state, the pivoted armature also has a substantially disk-like shape. The term "substantially disk-like" is intended to be understood here to mean that the respective sub-body is configured in a disk-like manner relative to a notional cross-sectional contour without in this instance recesses or other material cut-outs being considered.

In another preferred embodiment, the pivoted armature comprises, when viewed in a circumferential direction of the pivoted armature, at least one material cut-out. This material cut-out may, for example, have constructive reasons or is used to configure the pivoted armature to be more lightweight so that less force is required to open and/or close the valve. The shape of the material cut-outs may be freely selected in principle.

In another preferred embodiment, at least two of the material cut-outs are arranged on the armature in such a manner that two mutually opposite end portions of the, in particular rod-like, bearing axle are exposed. Consequently, the two sub-bodies may, for example, have rectangular notches or the like, by which the end portions of the bearing, when the two sub-bodies are in the connected state, are exposed. It is thereby possible to secure the pivoted armature to the valve housing or to counter-bearings of the valve housing.

In another preferred embodiment, when the first and second sub-bodies are in the connected state, a rotation axis of the pivoted armature is arranged in a middle plane of the pivoted armature, which is located orthogonally to an axis of rotational symmetry of the pivoted armature. The rotation axis is consequently preferably arranged congruently in the middle plane. This constitutes a difference with respect to the prior art because, in the prior art, the rotation axis of the bearing is arranged in a manner offset relative to the middle plane of the pivoted armature so that in this case internal torsional moments can be produced when the pivoted armature is opened and closed. This can be avoided by the arrangement according to the invention of the bearing or bearing axle since the rotation axis is now located in the middle plane. This arrangement of the rotation axis in the middle plane is enabled in that the pivoted armature is separated into two sub-bodies which are joined in order to form the pivoted armature.

In another preferred embodiment, the first sub-body comprises at least in regions a trough-like depression and the second sub-body comprises at least in regions a journal-like projection corresponding to the trough-like depression. It will be understood that in principle an alternative configuration, in which the second sub-body comprises at least in regions a trough-like depression and the first sub-body comprises at least in regions a journal-like projection corresponding to the trough-like depression, is also conceivable. The term "trough-like" may in principle be understood to be any geometry of the recess. Preferably, the trough-like depression is a cylindrical recess which is preferably arranged at a geometric center of the respective sub-body. For such a cylindrical recess, the other sub-body preferably has a cylindrical projection or journal which is also arranged at a geometric center of this sub-body.

In another preferred embodiment, the journal-like projection is centered, when the first and second sub-bodies are in the connected state, relative to the trough-like depression and engages in the trough-like depression. An auxiliary centering means is thereby provided for the assembly or the joining of the first sub-body and second sub-body.

It may also be preferable for one of the sub-bodies to have both a journal-like projection, which is in particular arranged in a centered manner, and a trough-like depression, which is in particular arranged in a centered manner. In this case, at least a portion of the journal-like projection can comprise the trough-like depression at an opposite side of a free-standing end region of the journal-like projection so that the recess therefore still projects as far as a location in the journal-like projection. In particular as a result of the free-standing end region of the journal-like projection which preferably comprises a planar face, a platform for an abutment of a pre-tensioning spring can be provided. Via the pre-tensioning spring, for example, the pivoted armature can then be pretensioned against the valve seat or against a housing portion or a housing shoulder.

In another preferred embodiment of the method according to the invention, the step of joining the first and second sub-bodies comprises as a joining process at least one clinching, welding, adhesive bonding and/or riveting. It will be understood that in principle a combination of the above-mentioned joining techniques is also possible in order to connect the first and second sub-bodies to each other. Furthermore, it will be understood that in principle additional joining techniques which are not listed here may also be used. Thus, for example, it is conceivable in principle for the first sub-body to be connected to the second sub-body via one or more screws or via a press-fit or the like.

It may be assumed that the definitions and explanations of the above-mentioned terms apply to all the aspects which are described in this description and below unless otherwise stated.

Other details, features and advantages of the invention will be appreciated from the following description of the preferred exemplary embodiments. In this instance, the respective features may be implemented alone per se or together in combination with each other. In particular, the features which are mentioned with respect to the pivoted armature may relate in an equivalent form to the method according to the invention and be used for a delimitation thereof without being set out in a determined form as respective embodiments of the method. It will be understood that relevant apparatus features can be re-formulated to form method features without departing from the scope of the present invention. The invention is not limited to the exemplary embodiments. The exemplary embodiments are schematically illustrated in the Figures. The same reference numerals in the individual Figures relate to identical or functionally identical elements or elements which correspond to each other with respect to their function.

Figure 2:
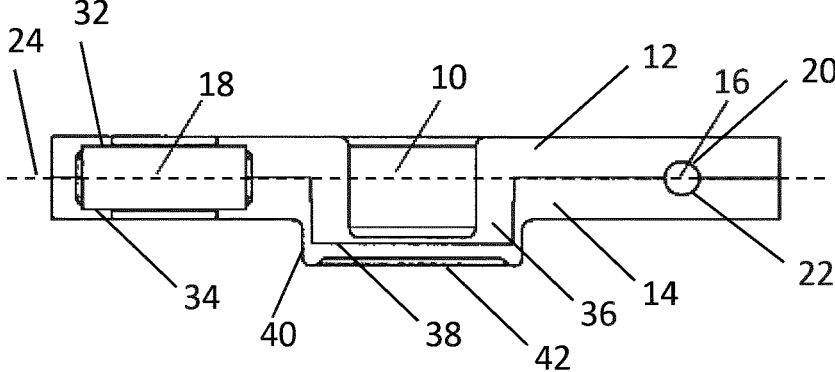
Figure 3:
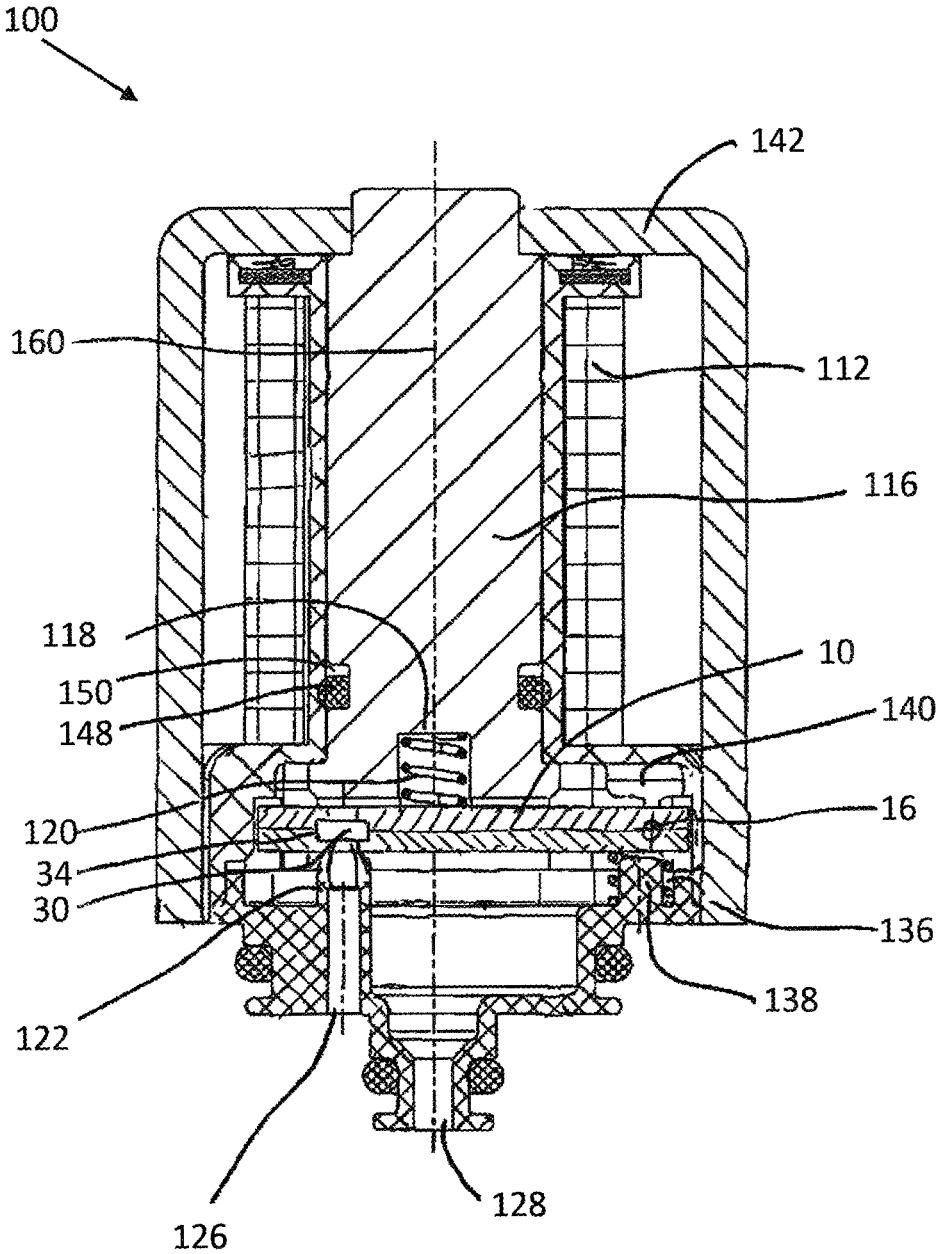
Figure 4:
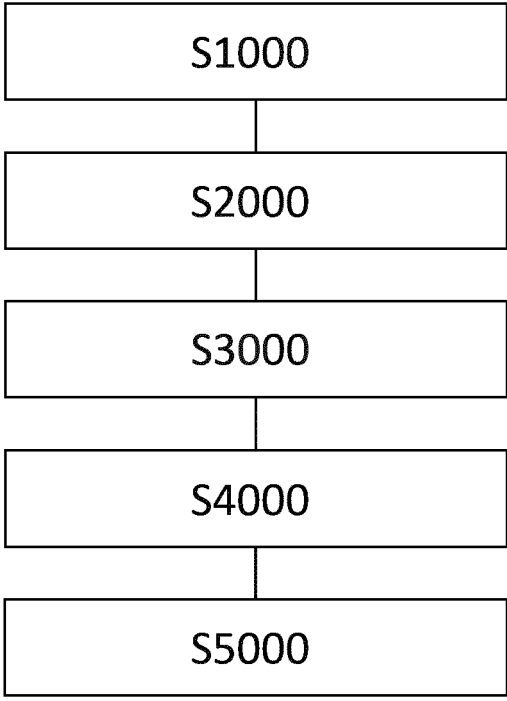

Details and embodiments of the invention will be explained below with reference to merely schematic drawings, in which:

FIG. 1: shows a schematic plan view of a pivoted armature according to the invention according to a first exemplary embodiment;

FIG. 2: shows a schematic sectioned view of a pivoted armature according to the invention according to the first exemplary embodiment;

FIG. 3: shows a schematic sectioned view of an electro-magnetic pivoted armature solenoid valve with a pivoted armature according to the invention according to a second exemplary embodiment; and FIG. 4: shows a method flow diagram of an exemplary embodiment of the method according to the invention.

FIG. 1 shows a schematic plan view of a pivoted armature 10 according to the invention according to a first exemplary embodiment. According to the invention the pivoted armature 10 has a first sub-body 12 and a second sub-body 14, wherein in FIG. 1, as a result of the plan view, only the first sub-body 12 can be seen. Furthermore, the pivoted armature 10 comprises a bearing 16 and a seal 18.

In this case, the bearing 16 is in the form of a rod-like bearing rod and is clamped between the first sub-body 12 and the second sub-body 14. To this end, the first sub-body 12 has a trough-like first groove 20 which extends in an elongate manner and which corresponds to a half cross section of the bearing rod 16. The second sub-body 14 also has a trough-like second groove 22 which extends in an elongate manner and which corresponds to a half cross section of the bearing rod 16. When the first sub-body 12 and the second sub-body 14 are in the connected state, the first groove 20 and the second groove 22 are arranged in a congruent and mirror-symmetrical manner with respect to a middle plane 24 of the pivoted armature 10 (see FIG. 1). The bearing rod 16 is thereby clamped between the first sub-body 12 and the second sub-body 14. The bearing rod 16 is not rotatable relative to the two sub-bodies 12, 14. In the fitted state, however, the pivoted armature is rotatable about a rotation axis 17 by means of the bearing rod 16 (see FIG. 1). The rotation axis 17 is located congruently in the middle plane 24 of the pivoted armature 10.

Furthermore, the two sub-bodies 12, 14 each have two material cut-outs 26 which are configured in a substantially rectangular manner. The material cut-outs 26 are congruent with respect to each other in the connected state of the two sub-bodies 12, 14. Two mutually opposite end regions 28 of the bearing 16 are thereby exposed and can be connected, for example, to a counter-bearing (not shown). The two sub-bodies 12, 14 further each have two circumferential recesses 30 which are provided substantially for reasons of weight-saving.

In this instance, the seal 18 is inserted between the first sub-body 12 and the second sub-body 14. To this end, the first sub-body 12 has in this instance a first recess 32 which is in the form of a stepped hole. The first recess 32 has a hole portion having a first diameter and a through-hole having a second diameter, wherein the first diameter is greater than the second diameter. Furthermore, the second sub-body 14 has a second recess 34 which is in the form of a stepped hole. The second recess 34 has a hole portion having a first diameter and a through-hole having a second diameter, wherein the first diameter is greater than the second diameter. The seal is partially received in the first recess 32 and the second recess 34. In this case, the seal 18 bears against a shoulder region of the two sub-bodies 12, 14 which is formed by the diameter difference between the first diameter and the second diameter, that is to say, a circular-ring-like abutment region. The seal 18 is thereby arranged in a loss-proof manner between the first sub-body 12 and the second sub-body 14. The seal 18 is in the form of a circular, cylindrical rubber seal in this instance. As a result of the respective through-hole, a portion of the seal 18 is exposed in an outward direction (see FIG. 1).

In this case, the two sub-bodies 12, 14 are centered relative to each other by means of a journal-like projection 36 which is formed on the first sub-body 12 around the geometric center thereof and, in the second sub-body 14, a trough-like depression 38 which corresponds thereto and which is formed around the geometric center thereof. Furthermore, a second journal-like projection 40 is formed on the second sub-body 14 around the geometric center thereof at the opposite side of the trough-like depression 38. The second journal-like projection 40 forms on the upper side thereof a support surface 42. The support surface 42 is formed so that the pivoted armature 10 can be pretensioned against a valve seat 122 by means of a pressure spring 120 in the fitted state (see FIG. 3).

The pivoted armature solenoid valve 100 according to FIG. 3 has a valve housing 142. A coil core 116 is arranged in the valve housing 142 in a manner centered along a longitudinal axis or axis of symmetry 160. The coil core 116 is surrounded by an electromagnetic coil 112 which is arranged around the coil core 116, for example, in the form of a plurality of wire windings.

For sealing, the coil core has an annular groove 150 in which an annular collar seal 148 is arranged so that a seal is ensured between the electrical portion of the pivoted armature solenoid valve 100 and the fluid-guiding portion of the pivoted armature solenoid valve 100. At an end region of the coil core 116, there is provided a recess 118 in which the pressure spring 120 is arranged. By means of the pressure spring 120, the pivoted armature 10 can be mechanically pretensioned against a valve seat 122 when the coil 112 is in the non-energized state so that the valve seat 122 abuts the seal 30 in a fluid-tight manner so that the pivoted armature solenoid valve 100 is closed. The pivoted armature 10 is supported at one side about the rotation axis 17 or by means of the bearing 16 in the valve housing 142. To this end, the valve housing 142 has an articulation projection 140 which acts as an abutment for the pivoted armature 10. Furthermore, the valve housing has a projection 138, around which a spring 136 is arranged. As a result of the spring 136, the pivoted armature is counter-tensioned. As a result of the articulation projection 140 and the spring 136 and the bearing 16, the pivoted armature can be pivoted at least between two positions (the closed position and the open position) about the rotation axis 17. In the closed state of the pivoted armature solenoid valve 100, it is not possible for a fluid to be able to flow between an inlet 128 and an outlet 126. If the coil 112 is supplied with electrical power, the magnetic pivoted armature is drawn counter to a pressing force of the pressure spring 120 in the direction of the coil core 116 until it comes to rest in an open position (for example, by abutment against a shoulder of the valve housing 142). In this open position, a passage is then released between the inlet 128 and the outlet 126 so that a fluid can flow through the valve.

FIG. 4 shows a flow diagram of an exemplary embodiment of the method according to the invention. The method for producing a pivoted armature 10 for the electromagnetic pivoted armature solenoid valve 100 is characterized by the following steps: providing S1000 the first sub-body 12 of the pivoted armature 10, the second sub-body 14 of the pivoted armature 10, the seal 18 and the bearing 16; inserting S2000 the seal 18 in the first sub-body 12; inserting S3000 the bearing 16 in the first sub-body 12; positioning S4000 the second sub-body 14 relative to the first sub-body 12; and joining S5000 the first sub-body 12 with the second sub-body 14 to form the pivoted armature 10.

LIST OF REFERENCE NUMERALS

10 Pivoted armature
12 First sub-body
14 Second sub-body
16 Bearing, bearing rod
18 Seal
20 First groove
22 Second groove
24 Middle plane
26 Material cut-outs
28 End regions
30 Recesses
32 First recess
34 Second recess
36 Journal-like projection
38 Trough-like depression
40 Second journal-like projection
42 Support surface
100 Pivoted armature solenoid valve
112 Coil
116 Coil core
118 Recess
120 Pressure spring
122 Valve seat
126 Outlet
128 Inlet
136 Spring
138 Projection
140 Articulation projection
142 Valve housing
148 Annular collar seal
150 Annular groove
160 Longitudinal axis or axis of symmetry
S1000 Providing
S2000 Inserting the seal
S3000 Inserting the bearing
S4000 Positioning
S5000 Joining

The invention claimed is:

1. A pivoted armature for an electromagnetic pivoted armature solenoid valve, which comprises a bearing and a seal, the pivoted armature comprising a first sub-body and a second sub-body, the first sub-body being connected to the second sub-body in a loss-proof manner, wherein the seal and the bearing are arranged between the first sub-body and the second sub-body, and wherein the first sub-body and/or the second sub-body have/bas a substantially disk-like shape.

2. The pivoted armature as claimed in claim 1, wherein the seal is inserted between the first sub-body and the second sub-body.

3. The pivoted armature as claimed in claim 1, wherein the first sub-body and/or the second sub-body comprise(s) at least one recess which is formed to at least partially receive the seal.

4. The pivoted armature as claimed in claim 1, wherein the bearing comprises an bearing axle.

5. The pivoted armature as claimed in claim 4, wherein the bearing axle is clamped between the first sub-body and the second sub-body in the connected state of the first and second sub-bodies.

6. The pivoted armature as claimed in claim 1, wherein the first sub-body is connected to the second sub-body by clinching, welding, adhesive bonding or riveting.

7. The pivoted armature as claimed in claim 1, wherein the pivoted armature comprises, when viewed in a circumferential direction of the pivoted armature, at least one material cut-out.

8. The pivoted armature as claimed in claim 4, wherein the pivoted armature comprises, when viewed in a circumferential direction of the pivoted armature, at least two material cut-outs, and wherein the at least two material cut-outs are arranged on the armature in such a manner that two mutually opposite end portions of the bearing axle are exposed.

9. The pivoted armature as claimed in claim 1, wherein, when the first and second sub-bodies are in the connected state, a rotation axis of the pivoted armature is arranged in a middle plane of the pivoted armature, which is located orthogonally to an axis of rotational symmetry of the pivoted armature.

10. The pivoted armature as claimed in claim 1, wherein the first sub-body comprises at least in regions a trough-like depression and the second sub-body comprises at least in regions a journal-like projection corresponding to the trough-like depression.

11. The pivoted armature as claimed in claim 10, wherein when the first and second sub-bodies are in the connected state, the journal-like projection is centered relative to the trough-like depression and engages therein.

12. An electromagnetic pivoted armature solenoid valve comprising a valve housing (142), further comprising a coil core which is arranged in the valve housing and is at least partially surrounded by an electromagnetically activatable coil, and comprising a pivoted armature as claimed in claim 1, wherein the pivoted armature is connected to the valve housing so as to be pivotable and/or foldable about at least one bearing axle and is configured to cooperate with a fixed valve seat so that, in response to the coil being supplied with electrical power, closing or releasing of the valve seat can be carried out.

13. A method for producing a pivoted armature for an electromagnetic pivoted armature solenoid valve as claimed in claim 1, comprising the following steps:

providing a first sub-body of the pivoted armature, a second sub-body of the pivoted armature, a seal and a bearing;

inserting the seal in the first sub-body;

inserting the bearing in the first sub-body;

positioning the second sub-body relative to the first sub-body; and joining the first sub-body with the second sub-body to form the pivoted armature.

14. The method as claimed in claim 13, wherein the step of joining comprises as a joining process clinching, welding, adhesive bonding and/or riveting.

15. A pivoted armature for an electromagnetic pivoted armature solenoid valve, which comprises a bearing and a seal, the pivoted armature comprising a first sub-body and a second sub-body, the first sub-body being connected to the second sub-body in a loss-proof manner, wherein the seal and the bearing are arranged between the first sub-body and the second sub-body, wherein the bearing comprises a bearing axle, and wherein the pivoted armature comprises, when viewed in a circumferential direction of the pivoted armature, at least two material cut-outs, and wherein the at least two material cut-outs are arranged on the armature in such a manner that two mutually opposite end portions of the bearing axle are exposed.

16. A pivoted armature for an electromagnetic pivoted armature solenoid valve, which comprises a bearing and a seal, the pivoted armature comprising a first sub-body and a second sub-body, the first sub-body being connected to the second sub-body in a loss-proof manner, wherein the seal and the bearing are arranged between the first sub-body and the second sub-body, and wherein the first sub-body comprises at least in regions a trough-like depression and the second sub-body comprises at least in regions a journal-like projection corresponding to the trough-like depression.

* * * * *